United States Patent [19]

Cheng et al.

[11] Patent Number: 5,634,355
[45] Date of Patent: Jun. 3, 1997

[54] CRYOGENIC SYSTEM FOR RECOVERY OF VOLATILE COMPOUNDS

[75] Inventors: Alan T. Y. Cheng, Livingston, N.J.; Deepak Lumba, Mohegan Lake, N.Y.

[73] Assignee: Praxair Technology, Inc., Danbury, Conn.

[21] Appl. No.: 522,446

[22] Filed: Aug. 31, 1995

[51] Int. Cl.$^6$ .................................................. F25J 3/00
[52] U.S. Cl. ............................................. 62/632; 62/906
[58] Field of Search ................................. 62/632, 906

[56] References Cited

U.S. PATENT DOCUMENTS

| | | | |
|---|---|---|---|
| 4,061,531 | 12/1977 | Jablin | 62/632 |
| 4,444,016 | 4/1984 | Banerjee | 62/54 |
| 4,551,981 | 11/1985 | Banerjee | 62/54 |
| 4,769,054 | 9/1988 | Steigman | 62/12 |
| 5,214,924 | 6/1993 | Karthaus et al. | 62/11 |
| 5,291,738 | 3/1994 | Waldrop | 62/36 |
| 5,390,499 | 2/1995 | Rhoades et al. | 62/632 |

*Primary Examiner*—Ronald C. Capossela
*Attorney, Agent, or Firm*—Stanley Ktorides

[57] ABSTRACT

A system for the recovery of volatile compounds comprising a direct contact condenser and an indirect heat exchanger, wherein the heat exchanger is driven by cryogenic fluid, and a heat exchange fluid, having the same composition as the volatile compound, recirculates between the condenser and the heat exchanger.

10 Claims, 3 Drawing Sheets

CRYOGENIC SYSTEM FOR RECOVERY OF VOLATILE COMPOUNDS

FIELD OF THE INVENTION

This invention relates generally to the recovery by condensation of a vapor phase component from a vapor stream, and more particularly, to the use of a cryogenic fluid to drive the condensation.

BACKGROUND OF THE INVENTION

As state and federal regulations set more and more stringent emission standards for stationary sources, there exists an increased need for effective and economical abatement techniques to handle air pollutants. The use of organic industrial solvents is widespread and many chemical, petrochemical and pharmaceutical processes are associated with the generation of large volumes of potentially hazardous organic vapors. Reactors, dryers, centrifuges, storage tanks, mixing vessels, purging, stripping or inert gas blanketing operations are some of the known sources of volatile organic compounds or VOCs.

To conform with air pollution control requirements and to improve the economics of a process, it is clearly beneficial for an operator to recover and reuse such volatile organic compounds. Several solvent recovery techniques are known, with condensation being one such technique. In many instances, one large condensation unit is used to treat the combined emissions from an entire industrial facility.

Shell and tube condensers are extensively used in solvent recovery but involve very high capital costs. Many industrial reactors are routinely equipped with water cooled shell and tube condensers from which condensed solvents can be purified and then recycled or stored for later use. It is often the case, however, that water cooled shell and tube condensers are not effective enough in recovering volatile organic compounds, particularly when the partial pressure of the volatile organic compound in the vapor stream is relatively low. One solution to this problem is to add heat transfer surface area for condensation. This, however, renders the condensation equipment large and cumbersome and leads to significant increases in water consumption. Low temperature refrigerants such as mechanically chilled glycol systems can also be used to improve the performance of shell and tube condensers. Even in this case, the surface area available for condensation must be large and the temperature of such mechanical systems is limited to about −100 degrees F. Such temperatures are simply not low enough to recover highly volatile organic compounds.

Lower temperatures can be generated with cryogenic fluids and the use of liquid nitrogen in the tube side of a shell and tube condenser is known. This practice, however, may result in substantial freezing of the volatile organic compound on the cold surfaces of the shell side. As frozen deposits form, the performance of the condenser deteriorates and a point is soon reached where the equipment must be shut down for defrosting. To simulate a continuous process and reduce down time, it is the conventional practice to run two shell and tube cryogenic condensers in an alternating mode. This however introduces additional capital costs.

Several other techniques which use cryogenic fluids to recover volatile organic compounds have been described.

U.S. Pat. No. 4,769,054 discloses a vapor abatement system that removes the volatile organic vapors from a vent gas stream by solidification. In this approach a solvent which has a much lower melting point than the volatile organic compound is chilled in a coil submerged in liquid nitrogen. Afterwards, the chilled solvent is placed in direct contact with the volatile organic vapor which freezes. This approach is cumbersome since the frozen volatile organic compound becomes contaminated with chilled solvent and thus an additional separation step must be introduced in the process. Furthermore, organic ice forms on the coil submerged in liquid nitrogen, reducing the heat transfer efficiency.

U.S. Pat. Nos. 4,444,016 and 4,551,981 describe multistage setups which include two shell and tube condensers. Liquid nitrogen is used at the third stage where it comes in direct contact with a solvent that it chills. The volatile organic compounds are condensed by direct contact with this chilled solvent and cold nitrogen gas. Besides the fact that this approach does not eliminate shell and tube condensers and their high capital costs, it has additional disadvantages. Liquid nitrogen evaporates on contact with the solvent and the cold nitrogen gas dilutes the vent gas, reducing the partial pressure and degree of saturation of the volatile compounds in the gas stream and lowering its recovery rate. Furthermore, because the nitrogen is injected directly into the broth of the organic solvent, it is contaminated and thus must undergo further treatment before it can be vented to the surrounding atmosphere. Opportunities for its reuse without undergoing purification are also limited. And because high pressure nitrogen is mixed with low pressure vent gas, the workable pressure head of the nitrogen is lost. Thus both purification and recompression steps must be undertaken before the nitrogen can be used elsewhere in the process facility.

In summary, each technique described above suffers from one or more disadvantages. Among these disadvantages are the use of expensive shell and tube condensers, the reduction of heat exchange efficiency due to solvent freezing on heat transfer surfaces, and the contamination of the cryogenic fluid with organic material.

OBJECTS OF THE INVENTION

It is therefore an object of the present invention to provide a continuous condensation process and a relatively compact and inexpensive apparatus to effectively separate and recover volatile compounds, such as common industrial solvent, from vapor streams.

It is a further object of this invention to recover such compounds so that they can be reused or stored without further treatment.

It is another object of the invention to employ cryogenic fluid to drive the recovery while maintaining the purity and workable pressure of the cryogenic fluid.

It is still another object of this invention to use a heat exchange system that prevents solvent freezing on heat transfer surfaces.

SUMMARY OF THE INVENTION

The above and other objects, which will become apparent to one skilled in the art upon a reading of this disclosure, are attained by the present invention, one aspect of which is:

A process for the recovery of a condensable component from a vapor stream comprising:

(A) directly contacting a vapor stream containing a condensable component with condensing liquid having the same composition as the condensable component;

(B) condensing the condensable component by direct heat exchange with the condensing liquid to produce a condensate;

(C) cooling at least a portion of said condensate to a temperature lower than the condensing temperature of the condensable component by indirect heat exchange with cryogenic fluid to produce cooled condensate;

(D) using at least a portion of said cooled condensate as said condensing liquid; and (E) recovering condensable component as part of the condensate.

Another aspect of the invention is:

Apparatus for the recovery of a condensable component from a vapor stream comprising:

(A) a condenser having direct contact heat exchange elements, and means for providing a feed stream into the condenser;

(B) a heat exchanger having a first flow path and a second flow path;

(C) means for passing fluid from the first flow path of the heat exchanger into the condenser, and means for passing fluid from the condenser into the first flow path of the heat exchanger;

(D) means for providing fluid into the second flow path of the heat exchanger, and means for withdrawing fluid from the second flow path of the heat exchanger; and (E) means for recovering product fluid from the apparatus.

As used herein, the term "structured packing" means packing wherein individual members have specific orientation relative to each other and to the condenser axis.

As used herein, the term "indirect heat exchange" means the bringing of two fluids in heat exchange relation without any physical contact or intermixing of the fluids with each other.

As used herein, the term "direct heat exchange" means the bringing of two fluids in heat exchange relation with physical contact of the fluids with each other.

As used herein, the term "recovered" means passed out of the system, i.e. actually recovered, in whole or in part, or otherwise removed from the system.

As used herein, the term "cryogenic fluid" means a fluid having a temperature at or below −100° F.

As used herein, the term "same composition" means comprising at least one of the same compound(s).

DETAILED DESCRIPTION

Figures 1, 2:
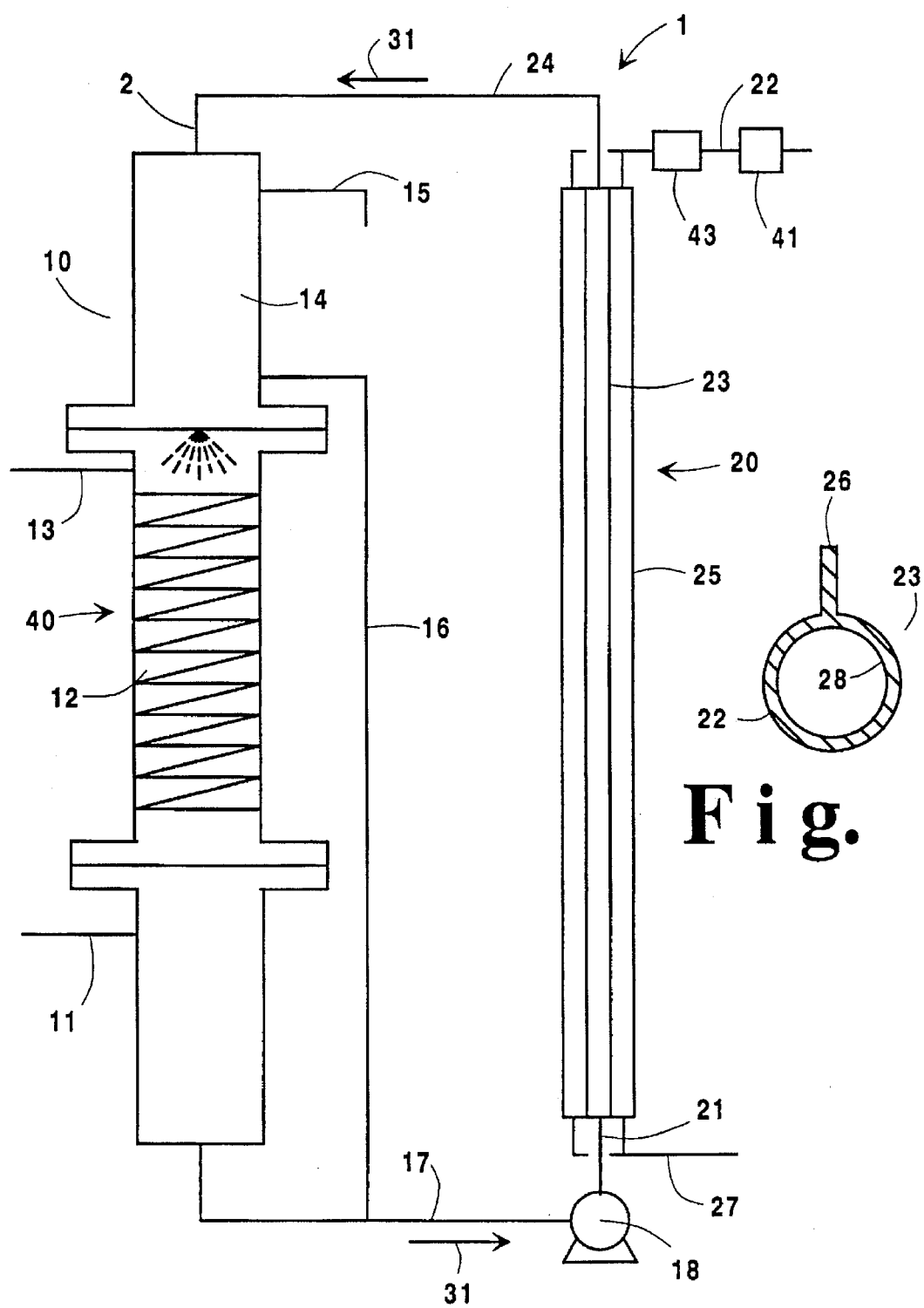
FIG. 1 is a simplified cross-sectional representation of one embodiment of a cryogenic heat exchanger and a reflux condenser wherein the method of this invention may be practiced.
FIG. 2 is a horizontal cross section of a preferred finned tube design for use with the cryogenic heat exchanger of the invention.

The invention relates to the condensation of materials from vapor streams, such as, for example, from waste vent gases generated from reactors, dryers, storage tanks, centrifuges, purging, mixing, blanketing and other operations. The invention is particularly well suited to remove volatile organic compounds from a vapor stream. It is understood herein that volatile organic compounds are organic compounds that exist in a gaseous state in ambient air. Even trace levels of such compounds can be removed using the invention. The invention is also well suited to recover a wide variety of common industrial solvents that may be present in a vapor stream. Examples of such solvents include but are not limited to: ketones such as acetone, halogenated compounds such as methylene chloride or carbon tetrachloride, acetates such as ethyl acetate, alcohols such as methanol, aliphatic hydrocarbons, aromatic hydrocarbons and others. Other organic compounds such as, for example, amines can also be recovered from a vapor stream using the invention.

The invention employs cryogenic fluids to drive the condensation. Compounds that can be used as cryogenic fluids in the practice of this invention include but are not limited to: nitrogen, noble gases, carbon oxides, oxygen and others. As understood herein, freon, methane or ethane (through vapor recompression), as well as mixtures resulting from combining liquefied cryogenic fluids with gaseous cryogenic or warmer fluids will also be referred to as cryogenic fluids. Because of the low temperatures that can be achieved using cryogenic fluids to cool the condensing liquid, even compounds that condense at very low temperatures and that cannot be condensed using conventional techniques, such as ethylene, ethylene oxide, ethane, butane and others can be recovered using the invention.

Vapor streams containing mixtures in which the components are miscible in one another, such as, for example, some mixtures of paraffins or mixtures of some alcohols and water, can also be handled using the invention.

The invention may also be practiced to remove from a warm vapor stream a compound which does not have appreciable vapor pressure at room temperature but which, nevertheless, may be gaseous in the warm vapor stream.

Furthermore, the invention can be practiced to separate not only a wide range of organic compounds from a vapor stream but also to recover or separate other, nonorganic materials from such a stream. For example, the invention may be used to recover water vapors from an inert gas stream. Other examples of nonorganic materials that might be separated or recovered using the invention include but are not limited to inorganic compounds such as heavy water, ammonia, tetrachlorosilane, bromine, hydrogen chloride, nitrous oxide and others.

All such compounds or materials and other similar materials which were not specifically mentioned but which can be recovered using the invention will be described and referred to herein as "condensable" or "condensed" materials, components, liquids or compounds. In their condensed state, they will be referred to as "condensate" or "condensates".

In addition to a condensable material, such as, for example, one of the organic solvents discussed above, the vapor stream is likely to contain gaseous materials that are not condensable when contacted with a condensing liquid cooled by indirect heat exchange with a cryogenic fluid. As with the nature of the material to be recovered, the exact composition of the vapor stream with respect to its noncondensable component depends on the process from which the vapor stream is generated. In many cases, the noncondensable component will be air. Blanketing and some drying operation may generate vent gases containing an inert gas such as nitrogen and some reactors may generate a noncondensable mixture of oxygen and nitrogen. Other examples of noncondensable components of the vapor streams that can be treated practicing the invention include but are not limited to: hydrogen, carbon dioxide, carbon monoxide, argon, oxygen, helium, and various mixtures of noncondensable gases.

The invention will be described in detail with reference to the drawings. Referring now to FIG. 1, not drawn to scale, there is shown, in a vertical cross-section, the recovery system 1. The recovery system 1 includes a condenser 10, having direct contact heat exchange elements 12 and feed input conduit 11, and a heat exchanger 20 having a first flow path 23 and a second flow path 25.

A condenser is a heat transfer device used to liquefy vapors by removing their latent heat. Condenser 10 is of the direct contact type, in that it provides for the physical mingling of the vapor stream with the cooling medium. Direct contact condensers, and their most common type, barometric condensers, are known. In conventional practice, the cooling medium generally used in such condensers is water.

When traces of materials, such as traces of a volatile organic compound, are to be removed from a vapor stream which also contains a noncondensable gas, such as, for example, air or nitrogen, the conventional direct contact condenser is not adequate. It was discovered that using a direct contact condenser wherein the condensing liquid had been cooled by indirect contact with a cryogenic fluid and wherein the condenser employed packing as the direct contact heat exchange elements resulted in excellent recovery of volatile organic compounds, even when the concentration of such volatile organic compounds in the vapor stream was in the parts per million by volume range.

Returning now to FIG. 1, condenser 10 is shown as having packing elements 12 within column portion 40. The packing that may be used in column 40 may be similar to packings typically used in mass transfer processes, such as distillation. Metallic packings are preferred because of their good heat conduction. The packing may be of the random loose type such as rings, beads or saddles. Structured packing, in particular metallic structured packing, however, is preferred, because it provides a uniform thermal distribution and condensation area and has a low pressure drop. Some examples of such structured packings include but are not limited to Flexipac® packing manufactured by Koch Engineering Company, Inc., or Glitsch Grid® manufactured by Glitsch, Inc.

Figure 3:
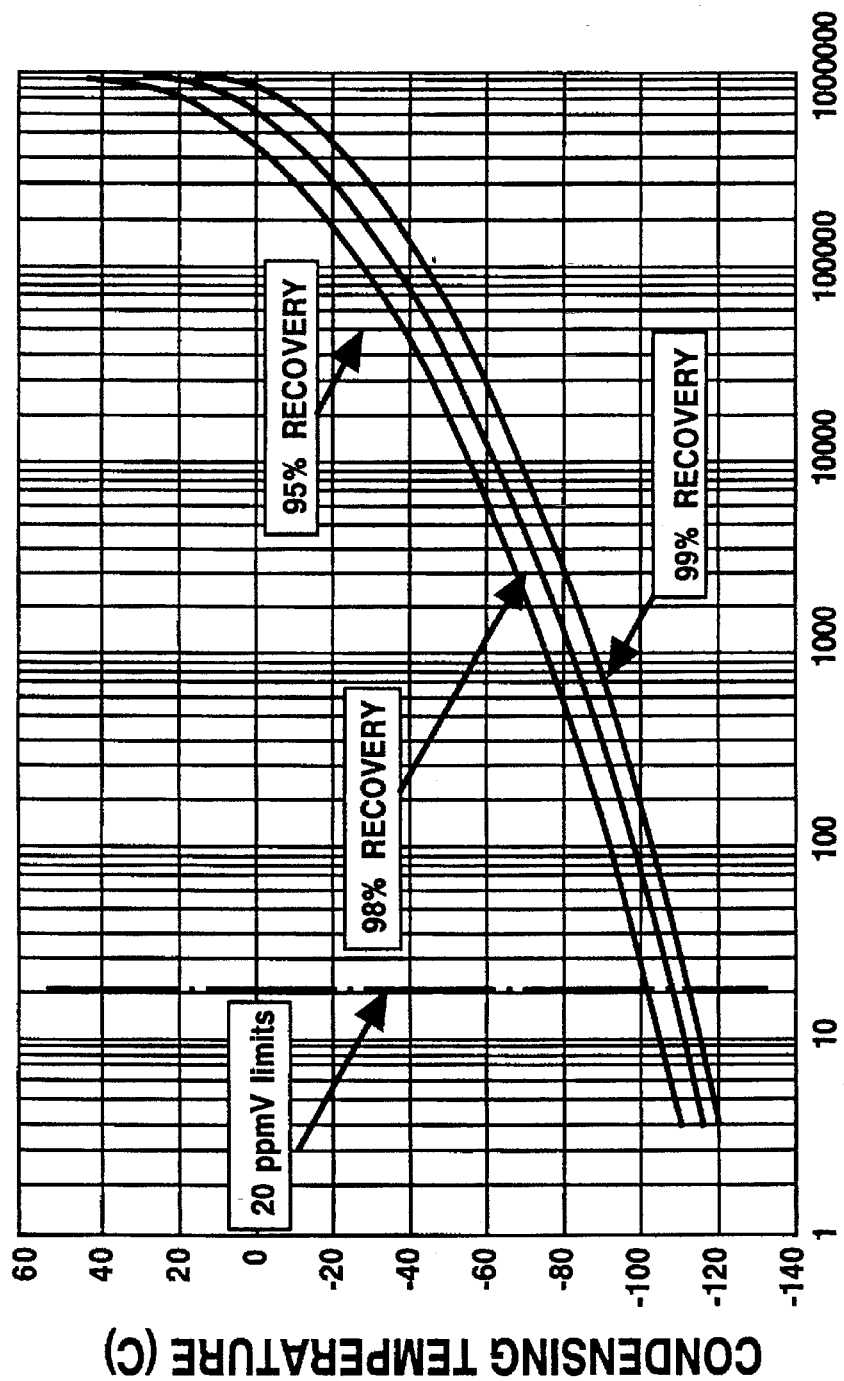
FIG. 3 illustrates the condensing temperature as a function of concentration of methanol present in a vent gas, at three recovery rates: 95%, 98% and 99%.
Figure 4:
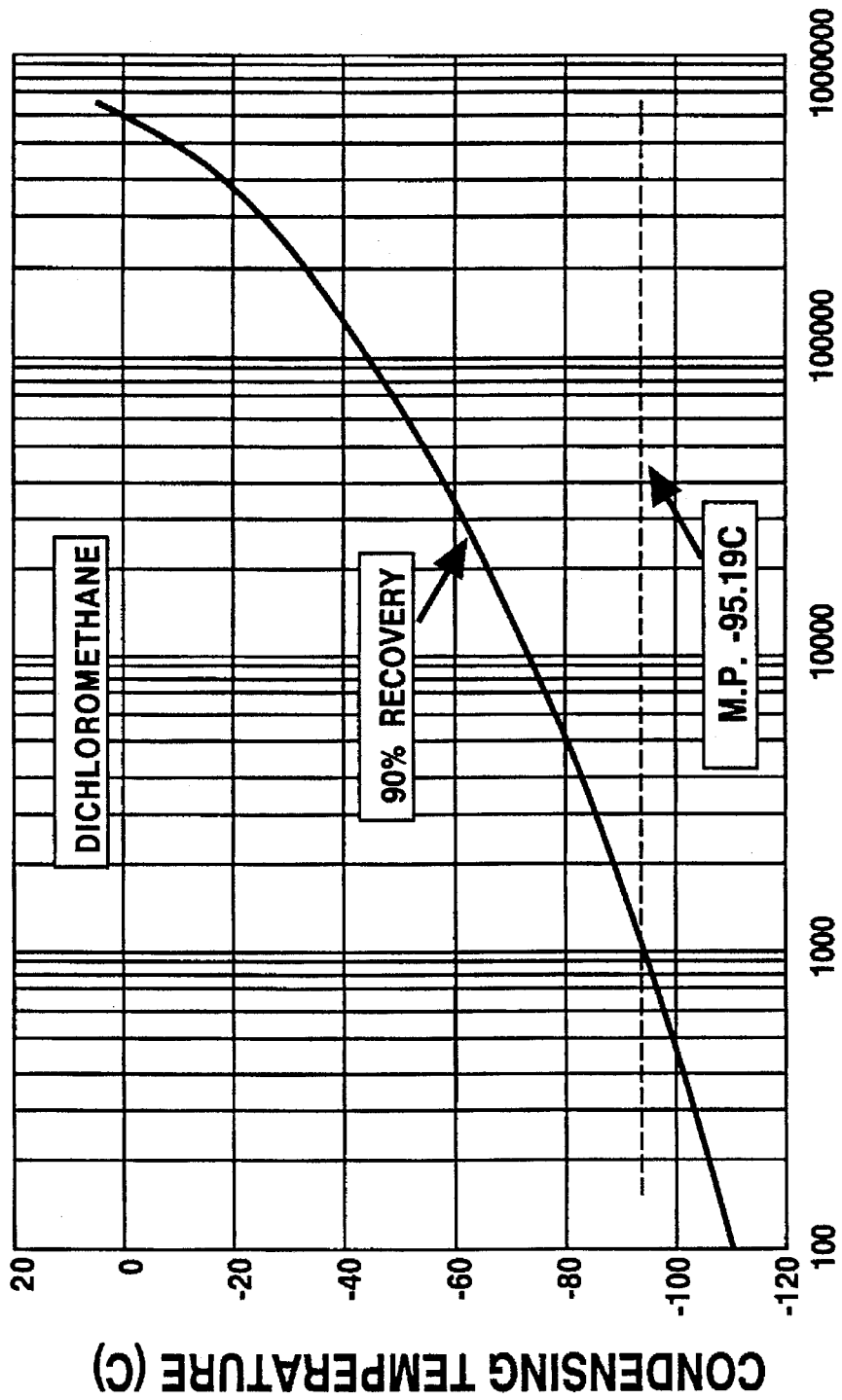
FIG. 4 shows condensing temperatures as a function of concentration for dichloromethane in a vent gas, for a recovery rate of 90%.

Vapor feed stream 11, such as, for example, a waste vent gas from a chemical reactor, which contains a condensable component, such as, for example, a volatile organic compound to be recovered, is introduced into the lower part of condenser 10 and rises through the packed column 40. Condensation occurs by direct contact between vapor stream 11 and a condensing liquid. By condensing liquid it is meant the liquid medium that removes heat from the vapor stream thereby liquefying the condensable component in the vapor stream. The packing of packed column 40 provides additional heat transfer area. The condensing liquid is provided to condenser 10 at a temperature that is lower than the condensing temperature required to condense a given portion of the condensable component in vapor stream 11. The condensing temperature varies depending on the vapor pressure of the condensable component present in vapor stream 11. For saturated vapor, the condensable component of vapor stream 11 will condense at warmer temperatures but lower condensing temperatures will be needed for handling partially saturated vapor streams. In one preferred practice, the invention may be used to remove volatile organic compounds from a waste vent gas. In such a case, it may be that the condensing temperature will be the temperature at which enough material is condensed in condenser 10, so that the amount of volatile organic compound still remaining in the vapor phase after passing through condenser 10 is not higher than the amount allowed by the applicable emission standards. FIG. 3 illustrates the condensing temperature in degrees C as a function of concentration in parts per million by volume of condensable material, in this case methanol, present in a vapor stream, in this case a vent gas, at three recovery rates: 95%, 98% and 99%. FIG. 4 shows condensing temperatures in degrees C as a function of concentration in parts per million by volume for dichloromethane in a vent gas, for a recovery rate of 90%.

In a preferred practice of the invention, the condensing liquid has a countercurrent direction with respect to the vapor stream 11 rising through condenser 10. Recovery efficiencies of 99% and better are thereby attained. The condensing liquid used to condense the condensable component of vapor stream 11 has the same composition as the volatile component of the vapor stream.

As condensation takes place within condenser 10, the condensable component is separated as a condensate from the noncondensable component of the vapor stream. The noncondensable component of the vapor stream, substantially free of condensable material, leaves condenser 10 as exit gas 13. The condensate, including the condensed condensable component and the condensing liquid, now warmer, exits at the bottom of the condenser as warm liquid 17.

It is a particular advantage of the invention that it can operate in a way in which the condensing liquid has the same chemical composition as the condensable component of vapor stream 11. The direct contact condensation process in condenser 10 creates no contamination of the condensable material that is to be recovered. Thus no further treatment is necessary before the condensed material can be reused or stored.

When several condensable components are to be removed from a vapor stream, it is possible to use as condensing liquid any one of those condensable components or a mixture of some or all of those components.

The condenser 10 preferably has a cold liquid reservoir 14 for holding cooled liquid 24. Along with the metallic packing, the reservoir provides a refrigeration heat sink and the process can thus tolerate fluctuations in flow rates and concentrations without causing a delayed response by the condenser and a drop in its performance. From reservoir 14, any overflowing chilled liquid can exit as product 15 to a storage tank or can be recycled back to the process from which it was generated as a component of vapor stream 11. Product fluid may also be recovered from other points of the system such as from streams 17 or 24.

If imiscible condensable components are to be recovered from a vapor stream, several condensers may be used. Thus for a water benzene mixture, water may be condensed in a first condenser and benzene in a second condenser which is also similar to the condenser disclosed herein.

The recovery system 1 also includes a heat exchanger 20 for cooling the warm liquid 17. Heat exchanger 20 provides indirect heat exchange. Refrigation of the heat exchanger 20 is provided by cryogenic fluid, preferably by liquid nitrogen. Other means for cooling the heat exchanger may include other cryogenic fluids such as liquid argon, other liquid noble gases, freon, methane or ethane (through vapor recompression), liquid carbon dioxide, fluids combining a cryogenic liquid and a cold gas such as for example mixtures of liquid nitrogen and nitrogen gas, and others.

Returning now to FIG. 1, heat exchanger 20 may be a tube heat exchanger, preferably a finned tube heat exchanger. Finned tube heat exchangers are known and are useful where one of the fluid streams has a much lower heat transfer coefficient than the other. Fins can be transverse, longitudinal or can be spikes, pins, studs or spines. FIG. 2, not drawn to scale, shows schematically one design of a finned tube that can be used in the invention. FIG. 2 represents a horizontal cross section cut through one longitudinal fin 26 of finned tube 23. One fin only is shown but additional fins can be used. As seen in FIG. 2, the interior surface 28 of finned tube 23 is not in physical contact with fin 26, and only the exterior surface 29 of finned tube 23 is in physical contact with fin 26. Thus finned tube 23 is a smooth tube with respect to the fluid flowing through its interior and presents extended heat transfer area to the fluid in contact with exterior surface 29.

As shown in FIG. 1, finned tube 23, which comprises the first flow path of heat exchanger 20, is enclosed in an outer chamber 25, which comprises the second flow path of heat exchanger 20. The preferred mode of operating heat exchanger 20 is to pump warm liquid 17 through pump 18 and pass pumped stream 21 into and through the interior of finned tube 23. With respect to warm liquid 17, the interior of finned tube 23 is a smooth tube since the warm liquid is in contact with interior surface 28; since liquids have much higher heat transfer coefficients than gases, an extended heat transfer area is not necessary for warm liquid 17.

Cryogenic fluid 22, preferably liquid nitrogen, is provided into chamber 25 and contacts exterior surface 29 of finned tube 23 and fins 26. It is withdrawn from outer chamber 25 as stream 27, typically in gaseous form. Extended heat transfer area is thus provided to the cryogenic fluid, which typically has a much lower heat transfer coefficient than warm liquid 17.

Warm liquid 17 is cooled by indirect heat exchange with the cryogenic fluid present outside finned tube 23. The resulting cooled liquid 24 is then passed from the first flow path 23 into condenser 10 and used as the condensing liquid of condenser 10.

A control valve 41 or other means of controlling the flow of cryogenic fluid, such as for example a choke valve, can be installed to control or restrict the flow of cryogenic fluid 22. The valve may also provide feedback for adjusting the flow of the cryogenic fluid. Additionally, a temperature measuring device 43, such as for example a thermocouple, may be used to monitor the temperature of cryogenic fluid 22.

It is desirable that the cryogenic fluid used in heat exchanger 20 be kept to a minimum. Flow control is employed to ensure that the heat exchanger does not become flooded and that the spent fluid discharged from the heat exchanger at 27 is in gaseous phase.

Although the cryogenic fluid can be passed co-currently to the warm liquid 17 within in heat exchanger 20, a countercurrent arrangement for the cryogenic fluid flow with respect to the flow of warm liquid 17 is preferred.

Because there is no direct contact between the cryogenic fluid and the warm liquid stream being cooled in finned tube 23, the purity of the cryogenic fluid is not impaired. Thus, if, for example, the cryogenic fluid used is liquid nitrogen, the spent nitrogen gas 27 can be used elsewhere at the facility and/or can be vented without further purification treatment. Moreover, since there is no mixing of the cryogenic fluid with a lower pressure stream, the workable pressure head of the nitrogen is not lost and the spent nitrogen gas can be used in a different process without further recompression. Typically the cryogenic fluid is provided to heat exchanger 20 at a pressure within the range of from 20 to 265 pounds per square inch absolute (psia) and withdrawn from heat exchanger 20 at a pressure within the range of from 14.7 to 250 psia.

When operated with liquid nitrogen, the finned tube exchanger disclosed herein provides high surface area and a high gradient for heat transfer; these features result in an advantageously small and compact unit.

The process disclosed herein may be operated continuously since freezing of the organic material on cold surfaces and the down time for defrosting such surfaces can be avoided. Thus the invention may incorporate various features to ensure that freezing does not occur. Pump 18 for example is selected in such a way as to pump the liquid fairly rapidly upwards through finned tube 23. A bypass line 16 may be added to the system to provide constant feed to pump 18 so that the velocity inside the inner tube remains constant at all times.

Instead of flooding the heat exchanging unit with a cryogenic fluid, the flow of cryogenic fluid 22 is kept to a minimum. Furthermore, the cryogenic fluid may be sprayed onto fins 26 and exterior surface 29 of finned tube 23. Some possible means of providing such a spray include nozzles or spargers, such as, for example, integrated metal spargers. Finned tube 23 is therefore cooled gradually and uniformly, without the formation of cold spots and without the danger of forming organic ice inside finned tube 23. The choice of materials and fin design of finned tube 23 may also be selected to optimize the uniformity of the heat transfer process.

Freezing may be prevented also by the choice of the cryogenic fluid supplied to heat exchanger 20. In some cases, liquid nitrogen, even at low flow rates, may provide too much refrigeration. In such a case mixing liquid nitrogen with nitrogen gas resolves such freezing problems without major equipment modifications. When such a mixture is used, the cryogenic fluid 22 entering heat exchanger 20 will generally be cold nitrogen gas rather than liquid nitrogen. The ratio of nitrogen gas to liquid nitrogen may be adjusted in order to obtain the temperature desired for cooling heat exchanger 20.

With respect to the operation of the recovery system 1, it is preferred that pump 18 be selected in such a way as to allow for rapid pumping inside finned tube 23. The rate for moving the organic liquid through finned tube 23 preferably is higher than the rate of distributing the condensing liquid through condenser 10. This prevents freezing inside heat exchanger 20 while, at the same time, prevents flooding packed column 40 and makes possible the maintenance of full cold liquid reservoir 14. It is further preferred that the piping design is such as to provide adequate net positive suction head for pump 18. Furthermore, for any given design, the temperature of the cooled liquid 24 is maintained and controlled by manipulating the flow rate of the cryogenic fluid to the heat exchanger.

Materials of construction for recovery system 1 must withstand possible corrosion by the compounds to be handled. In many cases stainless steel will be adequate but special materials, particularly resistant to attack by some of the chemical materials to be recovered, may be necessary in some operations. Plastics, Hastelloy®, Monel® are other possible materials.

Because cryogenic fluids may be used in heat exchanging unit 20, the materials used in making the unit must resist cracking when exposed to cryogenic temperatures. Stainless steel, aluminum, copper, and some alloys are some possible materials to be used.

The operation of recovery system 1 is very energy efficient especially with the preferred countercurrent arrangements in both the heat exchanger 20 and in condenser 10. As shown by arrows 31, warm liquid 17 circulates countercurrently to the flow of the cryogenic fluid in heat exchanger 20 and cooled liquid 24, which is the condensing liquid in condenser 10, flows countercurrently to the direction of the vapor stream 11 in condenser 10. It is expected that by using the countercurrent arrangement of the preferred embodiment of the invention, the spent cryogenic fluid 27 exiting the heat exchanger 20 can be dispensed at a temperature that is higher than the temperature of cooled liquid 24 which is used as the condensing liquid in condenser 10. Moreover, the temperature of warm liquid 17 can be close to the temperature of inlet vapor stream 11.

EXAMPLES

Tables 1–4 are provided to illustrate the effectiveness of the invention with respect to heat exchange efficiencies by showing the temperatures, in degrees C., for various streams. A recovery unit similar to the one shown in FIG. 1 with a 4" condenser and a 1½" finned tube heat exchanger was used. Flowrates for the vapor stream are given in standard cubic feet per hour or scfh. Liquid pumping rate, in gallons per minute or gpm, is the rate at which the warm liquid stream from the condenser is pumped through the finned tube heat exchanger Table 1 illustrates the case of recovery unit 1 treating a vapor stream containing nitrogen as its noncondensable component and water vapor as the condensable component to be recovered. The cryogenic fluid used in the heat exchanger was liquid nitrogen. The stream numbers correspond to those of FIG. 1.

TABLE 1

| Vapor Stream flow rate scfh | Liquid pumping rate gpm | Temperature, C | | | | N$_2$ gas out 27 | LN$_2$ used, lbs/hr 22 |
|---|---|---|---|---|---|---|---|
| | | Vapor Stream 11 | Exit Gas 13 | Warm Liquid 17 | Cooled liquid 24 | | |
| 1,066 | 3 | 20.6 | 8.7 | 8.4 | 8 | 10.6 | 8.8 |
| 1,066 | 3 | 21.6 | 7.8 | 7.4 | 7 | 10.1 | 8 |
| 1,066 | 3 | 21.8 | 5.2 | 4.8 | 4 | 7.8 | 9.6 |

Table 2 illustrates a hypothetical case which shows how the invention might be used in an industrial setting. The condensable vapor to be recovered is dichloromethane. The noncondensable component of the vapor stream is air. The cryogenic fluid is liquid nitrogen.

TABLE 2

| Vapor Stream flow rate scfh | Liquid pumping rate gpm | Temperature, C | | | | N$_2$ gas out |
|---|---|---|---|---|---|---|
| | | Vapor Stream in | Exit Gas | Warm liquid | Cooled liquid | |
| 1,200 | 3 | 5 | −50 | 0 | −60 | −5 |

Table 3 shows results from pilot demonstration to recover dichloromethane from an air stream. Liquid nitrogen was used as the cryogenic fluid in the finned tube heat exchanger. Only moderate recovery of dichloromethane was needed in this example. In such a case, either the temperature of the cooled liquid could be allowed to be higher or the flow rate of the condensing liquid distributed to the condenser can be reduced as compared to a situation requiring a greater recovery rate. In the example illustrated by Table 3, the distribution rate to condenser 10 was kept at a lower level than would have been required for a higher recovery rate. As a result, the temperature of the exit gas was much warmer than the cooled liquid entering the condenser. Clearly, for higher recovery efficiencies, the flow rate may be increased or the temperature of cold liquid can be reduced.

TABLE 3

| Vapor Stream | Temperature, C | | | |
|---|---|---|---|---|
| | Exit Gas | Warm liquid | Cooled liquid | N$_2$ gas out |
| 3.5 | −13.2 | −17.5 | −40 | −4 |
| 2 | 6.6 | −3.7 | −40 | −1 |

Table 4 illustrates pilot tests using a cryogenic fluid resulting from the mixing of liquid nitrogen with nitrogen gas. As for the case shown in Table 3, the vapor stream contained dichloromethane in air.

TABLE 4

| Vapor Stream | Temperature, C | | | | |
|---|---|---|---|---|---|
| | Exit Gas | Warm liquid | Cooled liquid | Cold N$_2$ Gas (in) | Warm N$_2$ Gas (out) |
| 22.7 | −10.6 | −19.1 | −40 | −111.4 | −53.2 |
| 22.8 | −6.2 | 4.2 | −42 | N/A | −59 |
| 23.7 | −9.1 | −4.4 | −40 | −101 | −80 |

Because the equipment disclosed is compact and relatively inexpensive, especially with respect to shell and tube condensers, individual emission streams at a given industrial facility may be treated separately. Since the operation uses a condensing liquid that has the same composition as the condensable material to be removed from the vapor stream, the individually recovered materials may be reused without the need for further treatment. In the case where the condensable component comprises more than one compound, the condensing liquid will generally contain the same compounds, though in differing concentrations.

Specific features of the invention are shown in the drawings for convenience only, as each feature may be combined with other features in accordance with the invention. Alternative embodiments will be recognized by those skilled in the art and are intended to be included within the scope of the claims.

What is claimed is:

1. A process for the recovery of a condensable component from a vapor stream comprising:

(A) directly contacting a vapor stream containing a condensable component with condensing liquid having the same composition as the condensable component on direct contact heat exchange elements which comprise structured packing;

(B) condensing the condensable component by direct heat exchange with the condensing liquid to produce a condensate.

(C) cooling at least a portion of said condensate to a temperature lower than the condensing temperature of the condensable component by indirect heat exchange with cryogenic fluid to produce cooled condensate;

(D) using at least a portion of said cooled condensate as said condensing liquid; and (E) recovering condensable component as part of the condensate.

2. The process of claim 1 wherein the cryogenic fluid comprises nitrogen.

3. The process of claim 1 wherein the condensable component comprises an organic compound.

4. The process of claim 1 wherein the indirect heat exchange is carried out under countercurrent flow conditions.

5. The process of claim 1 wherein the cryogenic fluid is at a pressure within the range of from 14.7 to 250 pounds per square inch absolute after the indirect heat exchange of step (C).

6. Apparatus for the recovery of a condensable component from a vapor stream comprising:

(A) a condenser having direct contact heat exchange elements which comprise structured packing, and means for providing a feed stream into the condenser;

(B) a heat exchanger having a first flow path and a second flow path;

(C) means for passing fluid from the first flow path of the heat exchanger into the condenser, and means for passing fluid from the condenser into the first flow path of the heat exchanger;

(D) means for providing fluid into the second flow path of the heat exchanger, and means for withdrawing fluid from the second flow path of the heat exchanger; and (E) means for recovering product fluid from the apparatus.

7. The apparatus of claim 6 wherein the first flow path of the heat exchanger comprises a finned tube and the second flow path of the heat exchanger comprises an outer tube concentrically oriented along the length of the finned tube.

8. The apparatus of claim 6 wherein the condenser further comprises a reservoir for holding condensing liquid.

9. Apparatus for the recovery of a condensable component from a vapor stream comprising:

(A) a condenser having direct contact heat exchange elements, and means for providing a feed stream into the condenser;

(B) a heat exchanger having a first flow path which comprises a finned tube, and a second flow path which comprises an outer tube concentrically oriented along the length of the finned tube;

(C) means for passing fluid from the first flow path of the heat exchanger into the condenser, and means for passing fluid from the condenser into the first flow path of the heat exchanger;

(D) means for providing fluid into the second flow path of the heat exchanger, and means for withdrawing fluid from the second flow path of the heat exchanger; and (E) means for recovering product fluid from the apparatus.

10. Apparatus for the recovery of a condensable component from a vapor stream comprising:

(A) a condenser having direct contact heat exchange elements which comprise random packing, and means for providing a feed stream into the condenser;

(B) a heat exchanger having a first flow path and a second flow path;

(C) means for passing fluid from the first flow path of the heat exchanger into the condenser, and means for passing fluid from the condenser into the first flow path of the heat exchanger;

(D) means for providing fluid into the second flow path of the heat exchanger, and means for withdrawing fluid from the second flow path of the heat exchanger; and (E) means for recovering product fluid from the apparatus.

* * * * *